United States Patent [19]

Germond

[11] Patent Number: 4,740,805
[45] Date of Patent: Apr. 26, 1988

[54] BACKGROUND FILL-LIGHTING SYSTEM

[76] Inventor: Richard S. Germond, P.O. Box 339, Unadilla, N.Y. 13849

[21] Appl. No.: 840,859

[22] Filed: Mar. 18, 1986

[51] Int. Cl.$^4$ ............................................. G03B 15/00
[52] U.S. Cl. ................................................. 354/291
[58] Field of Search ...................... 354/62, 63, 95, 292, 354/354, 290, 291, 80, 126, 127.1, 127.11, 127.12, 131, 132, 145.1; 350/117

[56] References Cited

U.S. PATENT DOCUMENTS

| | | | |
|---|---|---|---|
| 445,805 | 2/1891 | Entrekin | 354/291 |
| 1,038,135 | 9/1912 | Herricht | 354/126 |
| 2,140,602 | 12/1938 | Simjian | 354/290 |
| 2,314,642 | 3/1943 | Worcester | 354/290 |
| 3,314,742 | 4/1967 | Morgan | 350/117 |
| 3,811,750 | 5/1974 | Coulthard | 350/117 |
| 3,976,359 | 8/1976 | White | 350/117 X |
| 4,236,795 | 12/1980 | Kephart | 354/80 |
| 4,318,602 | 3/1982 | Yamanaka et al. | 354/127.11 X |

FOREIGN PATENT DOCUMENTS

| | | | |
|---|---|---|---|
| 203857 | 10/1959 | Austria | 354/126 |
| 130020 | 11/1978 | Japan | 354/131 |
| 121029 | 7/1984 | Japan | 354/126 |

Primary Examiner—Donald A. Griffin
Attorney, Agent, or Firm—Don E. Ferrell

[57] ABSTRACT

A background fill-lighting system for use in clinical portrait photography by dental health care personnel, and others, includes slaved fill-lighting of a concavely-shaped screen positionable behind the subject to be photographed. The slave lighting is mounted above or below the concave screen and is triggered by an electronic flash unit located on the camera. Resulting portraits have no distracting shadows on the background, while lens flare damage to resulting photographic images is eliminated.

10 Claims, 3 Drawing Sheets

FIG 4
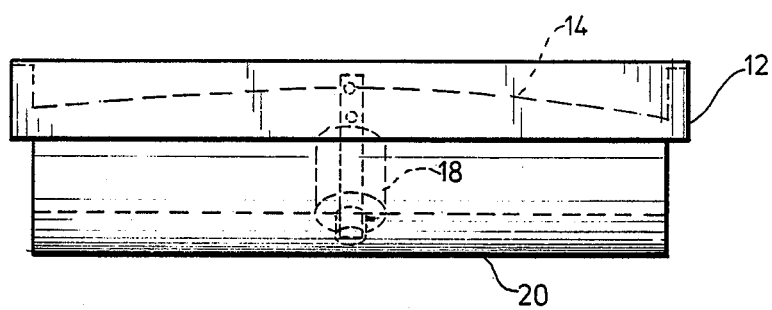
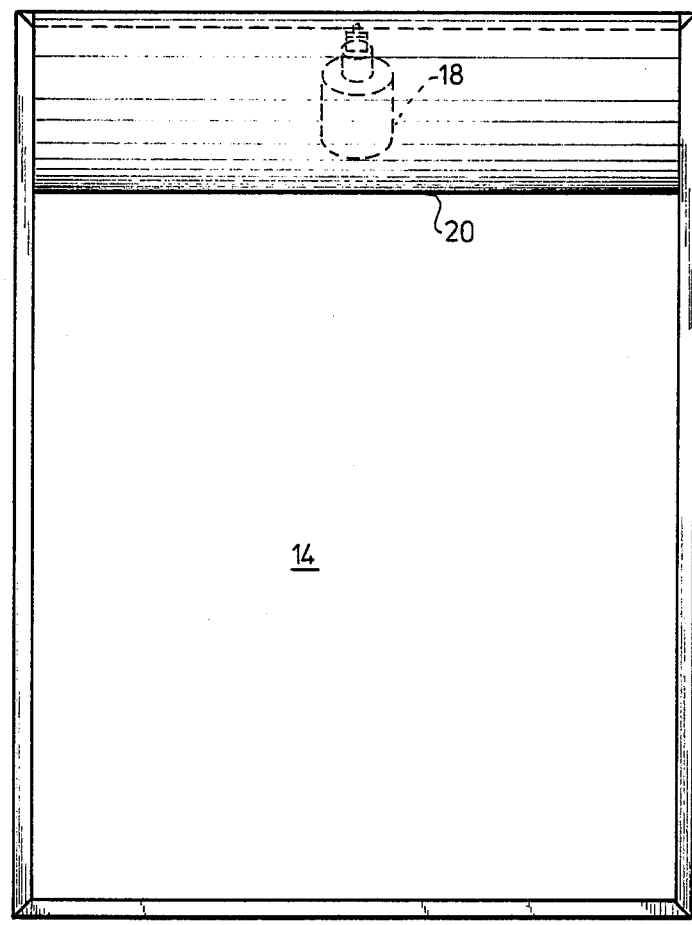
FIG 3
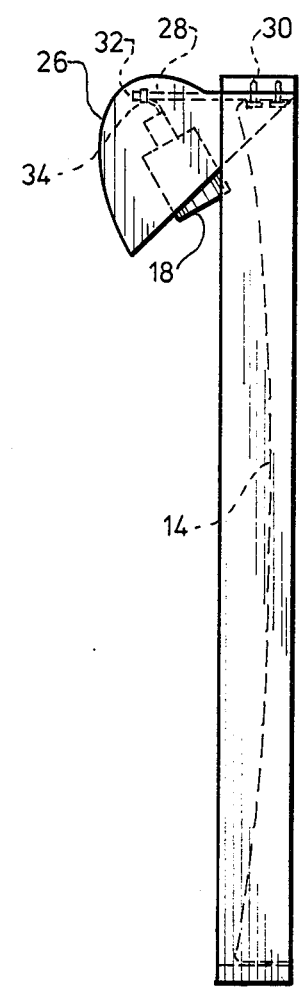
FIG 5

BACKGROUND FILL-LIGHTING SYSTEM

BACKGROUND OF THE INVENTION

1. Field of the Invention

The present invention relates to background lighting systems for photography, and more particularly pertains to a background fill-lighting system designed to eliminate portrait shadows and lens flare damage to photographic images through the use of a concavely-shaped reflecting screen positioned behind the subject to be photographed.

2. Description of the Prior Art

Many dentists, as well as other medical professionals, make extensive use of clinical photographic records. These records are taken to document the "before, during, and after treatment condition" of a patient. Clinical photographs often serve to augment other types of diagnostic services, for example X-rays, etc. Additionally, these records are being increasingly utilized as evidence in cases involving negligence and/or malpractice claims.

More importantly, clinical photographs operate as an excellent medical practice building tool. Showing a prospective patient examples of what has been done for others serves to build condifence in a dentists' ability and therefore serves to motivate patients to enter treatment. Likewise, the providing of a dramatic photographic comparison at the end of a successful, but long and complex course of treatment, reinforces both patient trust and confidence, while generating renewed enthusiasm on the part of these prospective and actual patients. This of course can lead to additional "word of mouth" advertising which results in new patient referrals.

Certain specialists, such as orthondontists, oral surgeons, peridontists, and prosthodontists are well indoctrinated and trained to use photography on a routine basis. Typically, these specialists may spend as much as $2,000 or more on photographic equipment to be utilized in their practices. Although this is a significant amount, many clinicians continue to be dissatisfied with the quality of their records—especially when confronted with a truly excellent set of photographic records from another source. Most clinical portrait photography conducted in private offices is generally considered poor due to inappropriate backgrounds and inadequate fill-lighting. Although professional lighting equipment is commercially available, such equipment is primarily designed for use in a more open space, such as is available in a photography studio. Dental offices and similar operatories are usually small and have very limited space, whereby studio lighting would be too obtrusive and cumbersome for efficient use.

As such, it can be appreciated that there exists a continuing need for background lighting systems which are properly fill-lighted, which eliminate distracting and unsightly shadows, and which reduce or eliminate "hot spots" (lens flare) in clinical portraits. In this respect, the present invention substantially fulfills this need.

SUMMARY OF THE INVENTION

In view of the foregoing disadvantages inherent in the known types of background lighting systems now present in the prior art, the present invention provides an improved background fill-lighting system wherein distracting and unsightly shadows, as well as lens flare spots, in clinical portraits are eliminated. As such, the general purpose of the present invention, which will be described subsequently in greater detail, is to provide a new and improved background fill-lighting system which has all of the advantages of the prior art background lighting systems and none of the disadvantages. To attain this, the present invention utilizes a background screen formed in the shape of a concave surface, with such screen being provided with a high contrast, white matte surface and also having a slaved lighting system positioned along a topmost, bottommost or some other preselected peripheral portion thereof. Preferably, the screen may be of a vacuum formed plastic and may include a power switch, as well as an operation light to indicate when the complete system is energized and ready for operation. The slave light assembly is triggered photoelectrically by an electronic flash unit located on the camera, and the entire assembly may be appropriately framed to provide a desired neat and aesthetic appearance.

There has thus been outlined, rather broadly, the more important features of the present invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions so far as they do not depart from the spirit and scope of the present invention.

It is therefore an object of the present invention to provide a new and improved background fill-lighting system which has all of the advantages of the prior art background lighting systems and none of the disadvantages.

It is another object of the present invention to provide a new and improved background fill-lighting system which may be easily and efficiently manufactured and marketed.

It is a further object of the present invention to provide a new and improved background fill-lighting system which is of a durable and reliable construction.

Still another object of the present invention is to provide a new and improved background fill-lighting system which substantially eliminates distracting and unsightly shadows in clinical portraits.

Even yet another object of the present invention is to provide a new and improved background fill-lighting system which substantially reduces or eliminates lens flare damage to resulting photographic images.

Yet another object of the present invention is to provide a new and improved background fill-lighting system which is characterized by a lightweight and stable construction, thereby to facilitate the installation and transporting thereof.

Even another object of the present invention is to provide a new and improved background fill-lighting system which utilizes an attached slave lighting structure to eliminate portrait shadows and lens flare damage.

An additional object of the present invention is to provide a new and improved background fill-lighting system which may serve as a slide or movie projection screen for small audience viewing.

An even further object of the present invention is to provide a new and improved background fill-lighting system which is susceptible of a low cost of manufacture with regard to both materials and labor, and which accordingly is then susceptible of low prices of sale to the consuming public, thereby making such background lighting system economically available to the buying public.

Still yet another object of the present invention is to provide a new and improved background fill-lighting system which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth will become apparent when consideration is given to the following detailed description thereof. Such description makes reference to the annexed drawings wherein:

FIG. 3 is a front elevation view of the invention.

FIG. 4 is a top plan view thereof.

FIG. 5 is a side elevation view of a modified embodiment of the invention.

DESCRIPTION OF THE PREFERRED EMBODIMENTS

Figures 1, 2:
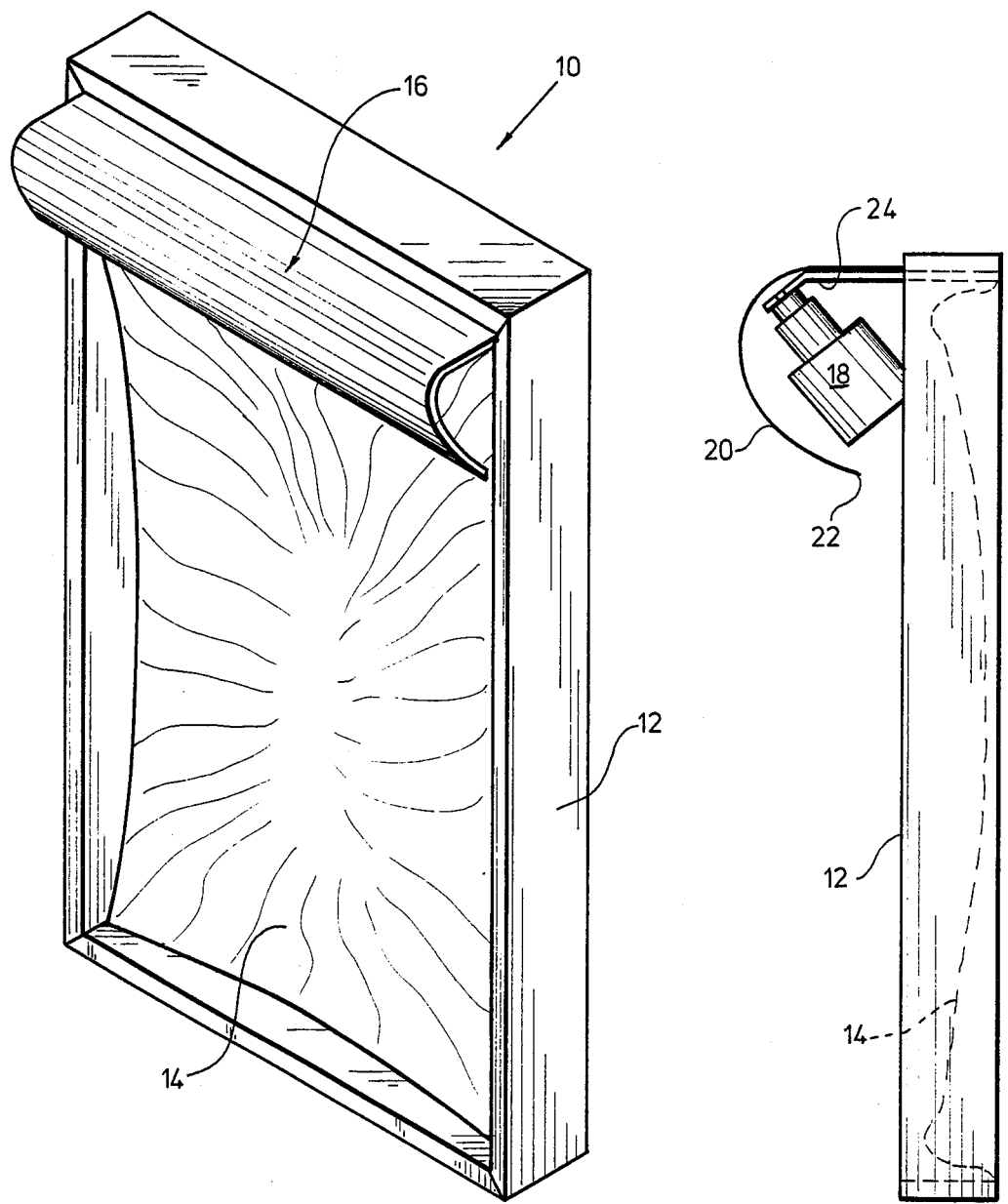
FIG. 1 is a perspective view of the background fill-lighting system comprising the present invention.
FIG. 2 is a side elevation view of the invention.

With reference now to the drawings and in particular to FIG. 1 thereof, a new and improved background fill-lighting system embodying the principles and concepts of the present invention and generally designated by the reference numeral 10 will be described.

More specifically, it will be noted that the background fill-lighting system 10 includes a support frame structure 12 into which is mounted a light reflective screen 14. As clearly illustrated, the support frame structure 12 is desirably of a rectangular shape, although any conceivable shape is within the intent and purview of the present invention, with the screen 14 then being of a conformingly fitted rectangular shape. Further illustrated in FIG. 1 is a lighting system 16 which is operable to selectively illuminate the screen 14 in a manner yet to be described.

With reference to FIGS. 2, 3 and 4 of the drawings in conjunction with FIG. 1, it will be noted that the screen 14 is concavely-shaped in both side-to-side and up-and-down directions, thereby to substantially define a dish shape which operates to reflectively direct light rays inwardly towards a center focal point, and increase the distance between the screen surface and slave flash socket attachment, thereby allowing the slave flash unit to be positioned in such a manner that the light beam from the slave flash may be more directly aimed at the center of the screen. The screen 14 may be of a plastic vacuum formed construction and desirably includes a white matte surface, although it is within the purview of the present invention to include a screen constructed of any known light-reflective material which would at least partially function in the manner of the present invention.

As is further illustrated in FIGS. 1-4 of the drawings, the lighting system 16 includes a slave flash 18 substantially centrally positioned along a topmost, bottommost or some other preselected peripheral portion of the frame structure 12, with a light shield 20 being positioned along the topmost, bottommost or other peripheral frame structure in a manner which operates to permit an illumination of only the screen 14 while not permitting interfering light glare to be detected by a camera positioned in front of the screen. More particularly, the shield 20 extends along the entire top, bottom or other peripheral edge of the frame structure 12 and includes a free edge 22 which is operably directed back towards the surface of the screen 14, whereby virtually all of the light emitted from the slave flash 20 will be directed at the surface of the screen as best illustrated in FIG. 2 of the drawings. As clearly illustrated in FIG. 2, the slave flash 20 may be operably mounted to a support member 24 by some conventional means, with such support member being further conventionally mounted to both the frame structure 12 and the covering shield 20.

FIG. 5 of the drawings has been provided to illustrate the versatility of the present invention. In this respect, a further slave flash covering shield 26 is illustrated, wherein this particular shield is differently shaped from a shield 20 shown in FIGS. 1 and 2 of the drawings. The more exaggerated concave shape of the shield 26 permits the use of a modified member 28 to which the slave flash 18 can be attached. The support member 28 may be attached to the screen through the use of some conventional means, such as by threaded fasteners 30, while being provided with a free end 32 extending outwardly from the screen and being juxtaposed to the shield 26 in a spaced-apart relationship. The flash 18 may then be secured thereto in a preselected fixed position or adjustably attached to the support member 28 by some slidable, selectively fixedly securable attachment means 34. In this connection, the attachment means 34 can comprise any type of coupling which may be selectively fixed, or slid along the support member 28 to thereby permit a selective positioning of the slave flash 18, while further serving to effectively grip the support member in a manner which provides rigid support to the slave flash. As such, the adjustable positioning of the slave flash 18 is afforded by this latter construction of the support member 28 and its associated light shield 26.

Figure 6:
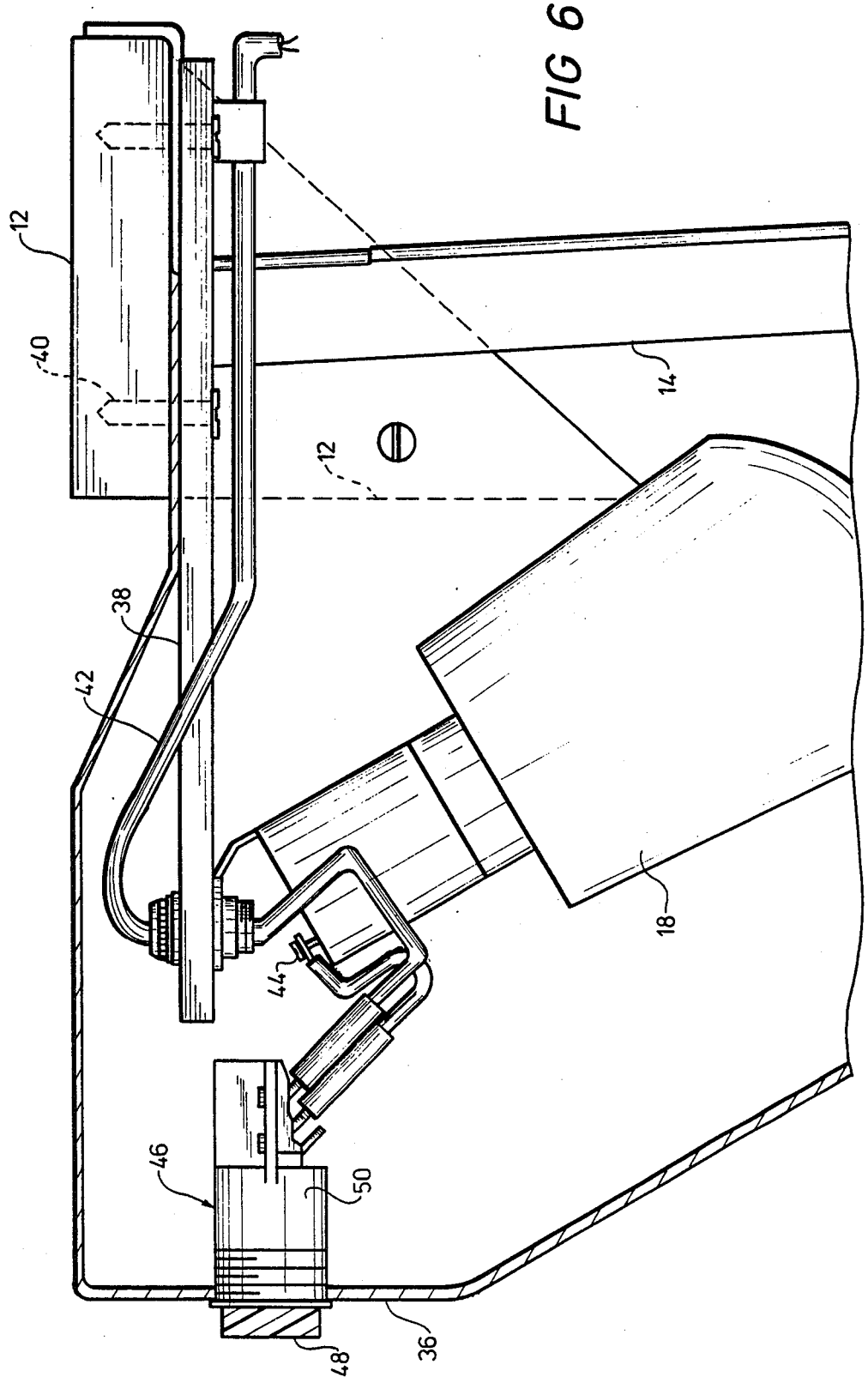
FIG. 6 is a enlarged detail view illustrating the slave light system forming a part of the invention.

FIG. 6 has been provided to illustrate a further manner of attachment of the slave flash 18 beneath a further light reflecting shield 36. In this construction, it will be noted that the slave flash 18 is mounted to a support member 38, which desirably consists of an aluminum bar or some other rigid type of support member, with such support member being mounted to the frame structure 12 by threaded fasteners 40. A power supply cord 42 is illustrated connected to switch 46 at an electrical connection 47.

Further illustrated is switch 46 operably extended through and attached to the light reflecting shield 36. The switch means 46 includes a pushbutton 48 which may be selectively operated to open or close the power supply circuit to the slave flash 18 by means of jumper wire from connection 45 on switch 46 to connection 44 on slave flash 18. It is also within the intent of the present invention to utilize a pushbutton 48 which is of a translucent or transparent construction, whereby an indicating light may be provided beneath the button. The unillustrated indicating light is contained within the housing 50 forming a part of the switch means 46 and is illuminated when power is provided to the slave flash 18. As such, the pushbutton 48 is concurrently illuminated when the slave flash 18 is energized, whereby the switch means 46 also functions as an indicator that the system 10 is operable and ready for use.

The slave flash 18 is operably and concurrently triggered, photo-electrically, by an electronic flash unit associated with an unillustrated camera positioned in front of the screen 14.

OPERATION

With respect to the manner of usage of the background fill-lighting system 10 comprising the present invention, it can be appreciated that a subject to be photographed may be positioned in front of the screen 14 with a camera then being positioned on an opposite side of the subject, whereby the subject is then effectively interposed between the screen and the camera. With the slave flash 18 being operably responsive to light from a flash unit associated with the camera, a use of the camera results in a concurrent illumination of the electronic flash associated therewith and also the slave flash 18 forming a part of the lighting system 16. The electronic flash associated with the camera will instantaneously project the subject's shadow onto the screen 14, and the concurrent illumination of the slave flash 18 behind the subject will serve to illuminate the darkened shadow areas on the screen 14, thereby to substantially eliminate any shadow effect. As can be appreciated, the light rays from the slave flash 18 and the reflected light rays from the screen 14 will be directed inwardly towards a focal point which is concealed by the photography subject positioned in front of the screen, and inasmuch as this focal point is behind the subject being photographed, no glare effect is transmitted back to the camera lens which could in turn result in flare spots on the developed film.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing in considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A background lighting system for use with cameras, x-ray machines, etc., said background lighting system comprising:
   a. screen means positionable behind a subject to be photographed, said subject being interposed between said screen means and an image recording means, said screen means having a substantially concave shape, said concave shape being directed both in a side-to-side and a top-to-bottom direction; and
   b. lighting means operably attached to said screen means, said lighting means serving to selectively illuminate said screen means during an image recording of said subject, thereby to eliminate shadows and lens glare in a recorded image.

2. The background lighting system of claim 1, wherein said screen means has a substantially rectangular shape.

3. The background lighting system of claim 2, wherein said lighting means includes a slave lighting assembly.

4. The background lighting system of claim 3, wherein said slave lighting assembly is operably controlled by an electronic flash unit on an image recording means, said image recording means comprising a camera.

5. The background lighting system of claim 4 wherein said slave lighting assembly further includes a shield to direct illumination onto said screen means.

6. The background lighting system of either of claims 1, 2 or 5 wherein said screen means is mounted in a support frame structure.

7. The background lighting system of claim 6 and further including a manual switch means for operably connecting said slave lighting assembly to an electronic flash unit.

8. The background lighting system of claim 7, and further including indicating means for indicating an operable readiness of said lighting means.

9. The background lighting system of claim 8, wherein said screen means is of a vacuum formed plastic construction.

10. The background lighting system of claim 9, wherein said screen means includes a white matte surface.

* * * * *